(12) United States Patent
Igarashi et al.

(10) Patent No.: US 6,466,632 B1
(45) Date of Patent: Oct. 15, 2002

(54) DIVERSITY RECEIVER

(75) Inventors: Hideki Igarashi; Naohito Tomoe, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/286,666

(22) Filed: Apr. 6, 1999

(30) Foreign Application Priority Data

Aug. 27, 1998 (JP) .......................................... 10-241308

(51) Int. Cl.[7] ................................................. H04B 7/10
(52) U.S. Cl. ...................................... 375/347; 445/137
(58) Field of Search ................................ 375/329, 326, 375/347, 340; 370/347; 455/137

(56) References Cited

U.S. PATENT DOCUMENTS

| | | | |
|---|---|---|---|
| 5,499,272 A | * 3/1996 | Bottomley | ................... 375/340 |
| 5,602,484 A | 2/1997 | Suzuki et al. | |
| 5,684,836 A | * 11/1997 | Nagayasu et al. | .......... 329/307 |
| 6,327,314 B1 | * 12/2001 | Cimini et al. | ............... 342/378 |

\* cited by examiner

*Primary Examiner*—Stephen Chin
*Assistant Examiner*—Kevin Kim (57) ABSTRACT

A diversity receiver includes: a differential detection diversity reception circuit for performing a diversity reception with employment of a differential detection to thereby output hard decision data thereof; a least-squares combining diversity reception circuit for performing a least-squares combining diversity reception to thereby output differentially decoded result of the hard decision data; a selection control circuit for producing a selection control signal used to select one of the hard decision data outputted from the differential detection diversity reception circuit and the differentially decoded result outputted from the least-squares combining diversity reception circuit based upon a predetermined selection basis; and a selection circuit for selecting one of the hard decision data and the differentially decoded result based upon the selection control signal.

6 Claims, 9 Drawing Sheets

DIVERSITY RECEIVER

BACKGROUND OF THE INVENTION

1. Field of the Invention

The present invention relates to a diversity receiver used in a digital radio communication appliance for digital mobile communications, digital satellite communications, digital mobile satellite communications, or the like.

2. Description of the Related Art

In digital mobile communication systems, a fading phenomenon may occur, since electromagnetic waves are reflected, diffracted, and scattered by regions and articles located around a mobile station. In the fading phenomenon, amplitudes of received signals and phases of these received signals are severely varied. Under such a fading environment, since the amplitudes of the received signals and the phases thereof are severely varied, a coherent detection using recovered carrier can be hardly realized.

As a result, a differential detection may be usually employed. In the differential detection, a differential coding operation is carried out on a transmission side, whereas a received signal before 1 symbol is used as a reference signal.

As one of the conventional techniques capable of improving the performance under such a fading environment, the diversity reception technique is known in the field, by which signals are received in plural branches, and then these received signals are combined with each other, or selected. Also, as the diversity reception techniques using the differential detection, there are the antenna selecting diversity reception, the postdetection selecting diversity reception, and the postdetection combining diversity reception. In the antenna selecting diversity reception, the demodulated result of such a branch that the received signal power is larger than other received signal power is selected every burst. In the postdetection selecting diversity reception, the demodulated result of such a branch that the received signal power is larger than other received signal power is selected every symbol. In the postdetection combining diversity reception, the differential detection results of the respective branches are combined with each other.

As one prior art, a description will now be made of an arrangement of a differential detection diversity receiver and operation of the diversity receiver in which a quadrature phase shift keying (QPSK) signal which has been differentially coded is detected, and thereafter the detected QPSK signals are combined with each other for the diversity reception.

Figure 17:
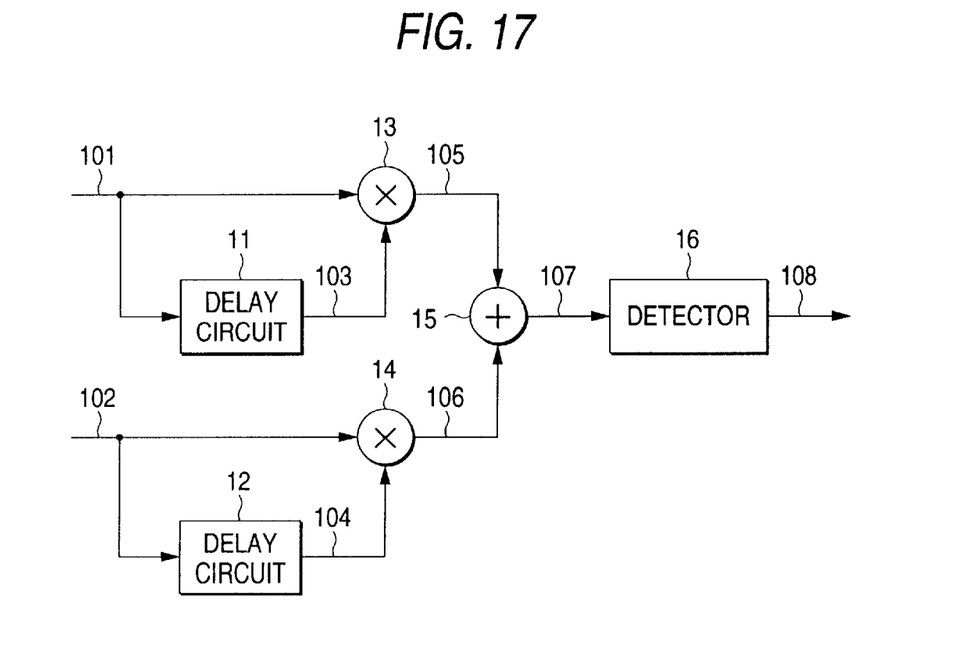
FIG. 17 is a block diagram for representing the arrangement of the conventional differential detection diversity receiver.

FIG. 17 is a block diagram for showing a conventional differential detection diversity receiver. The differential detection diversity receiver is described in, for example, the publication "BER Performance of QDPSK with Postdetection Diversity Reception in Mobile Radio Channels" written by F. Adachi and K. Ohono, IEEE Transactions on Vehicular Technology, Volume 40, No. 1, in 1991, pages 237 to 249. In the drawing reference numerals 11 and 12 show delay circuits, reference numerals 13 and 14 indicate multipliers, reference numeral 15 represents an adder, and reference numeral 16 shows a detector. Also, reference numerals 101 and 102 show received baseband signals, reference numerals 103 and 104 represent received baseband signals before 1 symbol, reference numerals 105 and 106 denote differential detection results, reference numeral 107 indicates soft decision data, and reference numeral 108 shows hard decision data.

Next, the operation of the differential detection diversity receiver will now be explained.

When the received baseband signal 101 of the branch 1 is inputted, the delay circuit 11 delays the received baseband signal 101 by time corresponding to 1 symbol to output the delayed received baseband signal as the received baseband signal 103 before 1 symbol.

The multiplier 13 performs the complex multiplication between the received baseband signal 101 and the received baseband signal 103 before 1 symbol to output the differential detection result 105.

When the received baseband signal 102 of the branch 2 is inputted, the delay circuit 12 delays the received baseband signal 102 by time corresponding to 1 symbol to output the delayed received baseband signal as the received baseband signal 104 before 1 symbol.

The multiplier 14 performs the complex multiplication between the received baseband signal 102 and the received baseband signal 104 before 1 symbol to output the differential detection result 106.

The adder 15 performs the complex adding operation between the differential detection result 105 of the branch 1 and the differential detection result 106 of the branch 2 to output the soft decision data 107.

The detector 16 performs the hard decision with respect to the soft decision data 107 to output the hard decision data 108.

As previously explained, the differential detection diversity receiver for executing the postdetection combining diversity reception can improve the performance by combining the differential detection results of the respective branches, as compared with the other receiver which does not execute the diversity reception. Also, the postdetection combining diversity may represent better performances than that of the antenna selection diversity, or that of the postdetection selection diversity for selecting the demodulated result of such a branch that the received signal power is larger than other received signal power every burst, or every symbol.

On the other hand, in digital mobile communication systems, one trial has been made in order to effectively utilize a frequency by reducing a zone radius of a cell and by repeatedly using the same frequency. At this time, there is such a problem that the co-channel interference will occur, which is caused by the electromagnetic waves leaked from the adjoining cells with using the same frequency, and therefore the performance is deteriorated.

As one of the techniques capable of mitigating the deterioration in the performance caused by the co-channel interference, the least-squares combining diversity technique is known. In the least-squares combining diversity, the received signals of the respective branches are combined with each other in order that the square mean value of the error signals can be reduced as small as possible.

As second prior art, an arrangement and operations of a least-squares combining diversity receiver capable of performing least-squares combining with respect to a QPSK signal will now be described.

Figure 18:
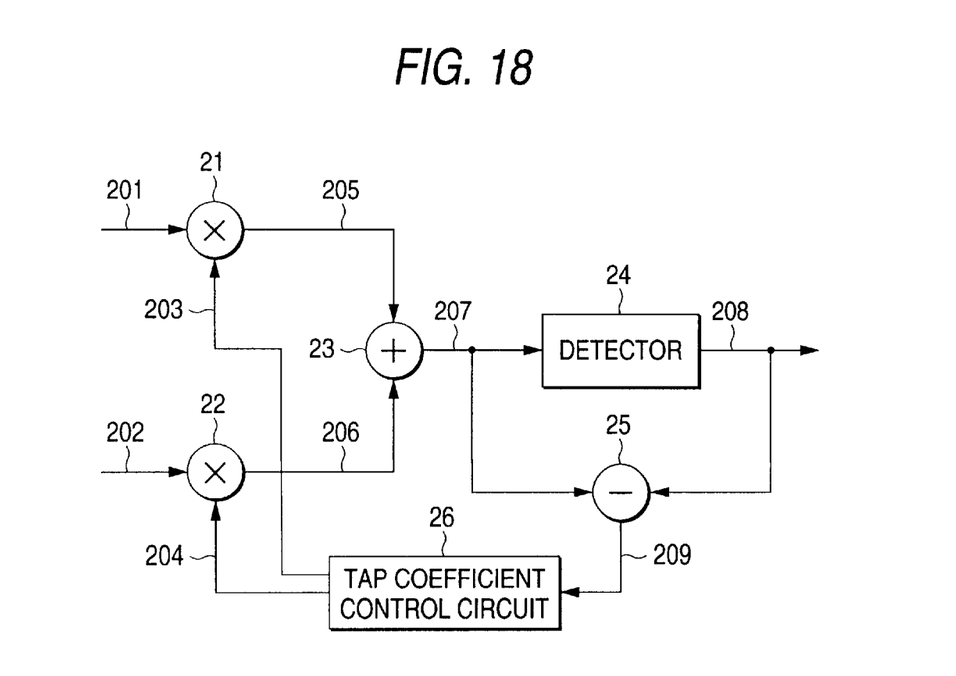
FIG. 18 is a block diagram for showing the arrangement of the conventional least-squares combining diversity receiver.

FIG. 18 is a block diagram for indicating an arrangement of a conventional least-squares combining diversity receiver. The conventional least-squares combining diversity receiver is described in, for example, the publication "Interference Cancelling Characteristics of Diversity Reception with Least-Squares Combining—MMSE Characteristics and BER Performance" written by H. SUZUKI, IEICE Transactions on Communications, volume J 74-B-II, No. 12 in 1991, pages 637 to 645.

In the drawing, reference numerals 21 and 22 indicate multipliers, reference numeral 23 shows an adder, reference numeral 24 indicates a detector, reference numeral 25 represents a subtracter, and reference numeral 26 shows a tap coefficient control circuit. Also, reference numerals 201 and 202 show received baseband signals, reference numerals 203 and 204 represent tap coefficients, reference numerals 205 and 206 are multiplication results, reference numeral 207 shows soft decision data, reference numeral 208 indicates hard decision data, and reference numeral 209 denotes an error signal.

Next, the operation of the least-squares combining diversity receiver will now be described.

The multiplier 21 performs the complex multiplication between the tap coefficient 203 determined by the tap coefficient control circuit 26 and the received baseband signal 201 of the branch 1 to output the multiplication result 205.

The multiplier 22 performs the complex multiplication between the tap coefficient 204 determined by the tap coefficient control circuit 26 and the received baseband signal 202 of the branch 2 to output the multiplication result 206.

The adder 23 performs the complex adding operation between the multiplication result 205 of the branch 1 and the multiplication result 206 of the branch 2 to output the soft decision data 207.

The detector 24 performs the hard decision with respect to the soft decision data 207 to output the hard decision data 208.

The subtracter 25 executes the complex subtraction between the soft decision 207 and the hard decision 208 to output the error signal 209.

When the error signal 209 is entered, the tap coefficient control circuit 26 controls the tap coefficients 203 and 204 in such a manner that the square mean value of the error signal 209 can be reduced as small as possible. As the adaptive algorithm for controlling the tap coefficient, the least mean square (LMS) algorithm or the recursive least squares (RLS) algorithm are often employed.

As previously explained, in the least-squares combining diversity receiver, even when the received baseband signals 101 and 102 contain the co-channel interference components, since the tap coefficient is controlled in such a manner that the square mean value of the error signal can be reduced as small as possible, the adverse influence caused by the co-channel interference can be mitigated.

The conventional differential detection diversity receiver and the conventional least-squares combining diversity receiver are arranged and operated in the above-described manners. The performance of the differential detection diversity receiver is deteriorated under such a condition that the co-channel interference is present. The performance of the least-squares combining diversity receiver is deteriorated in such a case that the fast variation occurs in the fading phenomenon.

SUMMARY OF THE INVENTION

The present invention has been made to solve the above-described problems, and therefore, has an object to provide a diversity receiver capable of representing better performance even under such a condition that co-channel interference is present, and even when the fading phenomenon is quickly varied.

A diversity receiver, according to a first aspect of the invention, is featured by comprising; a differential detection diversity reception circuit for performing a diversity reception with employment of a differential detection to thereby output hard decision data thereof; a least-squares combining diversity reception circuit for performing a least-squares combining diversity reception to thereby output a differentially decoded result of the hard decision data; a selection control circuit for producing a selection control signal used to select one of the hard decision data outputted from the differential detection diversity reception circuit and the differentially decoded result outputted from the least-squares combining diversity reception circuit based upon a predetermined selection basis; and a selection circuit for selecting one of the hard decision data and the differentially decoded result based upon the selection control signal.

A diversity receiver, according to a second aspect of the invention, is featured by that the differential detection diversity reception circuit further outputs soft decision data; the least-squares combining diversity reception circuit further outputs reliability information; the selection control circuit produces a selection control signal used to select one of the soft decision data/hard decision data outputted from the differential detection diversity reception circuit, and the reliability information/differentially decoded result outputted from the least-squares combining diversity reception circuit based upon a predetermined selection basis; and the selection circuit selects one of the soft decision data/hard decision data and also the reliability information/differentially decoded result in response to the selection control signal.

A diversity receiver, according to a third aspect of the invention, is featured by that while receiving the hard decision data outputted from the differential detection diversity reception circuit, the differentially decoded result outputted from the least-squares combining diversity reception circuit, and further a prerecognized reference signal, the selection control circuit calculates a correlation among the reference signal and a portion of the hard decision data, corresponding to the reference signal; a portion of the differentially decoded result, corresponding to the reference signal; and the selection control circuit produces a selection control signal used to select one of the soft decision data/ hard decision data outputted from the differential detection diversity reception circuit and also the reliability information/differentially decoded result outputted from the least-squares combining diversity reception circuit based on a dimension of coincident symbol numbers.

A diversity receiver, according to a fourth aspect of the invention, is featured by that the differential detection diversity reception circuit further produces an error signal; the least-squares combining diversity reception circuit further outputs an error signal; and the selection control circuit produces a selection control signal used to select one of the soft decision data/hard decision data outputted from the differential detection diversity reception circuit and the reliability information/differentially decoded result outputted from the least-squares combining diversity reception circuit based upon such a fact as to whether or not a mean squared value of the error signal outputted from the differential detection diversity reception circuit is larger than a mean squared value of the error signal outputted from the least-squares combining diversity reception circuit.

A diversity receiver, according to a fifth aspect of the invention, is featured by that the selection circuit produces a selection control signal used to select one of the soft decision data/hard decision data outputted from the differential detection diversity reception circuit and the reliability information/differentially decoded result outputted from the least-squares combining diversity reception circuit based upon a fading pitch detected from the received signals of the plural branches.

A diversity receiver, according to a sixth aspect of the invention, is featured by that the selection control circuit produces a selection control signal used to select one of the soft decision data/hard decision data outputted from the differential detection diversity reception circuit and the reliability information/differentially decoded result outputted from the least-squares combining diversity reception circuit based upon received signal power calculated from the received signals of the plural branches.

DETAILED DESCRIPTION OF THE PREFERRED EMBODIMENTS

Embodiments of the Present Invention will now be Described as Follows:

(EMBODIMENT 1)

Figure 1:
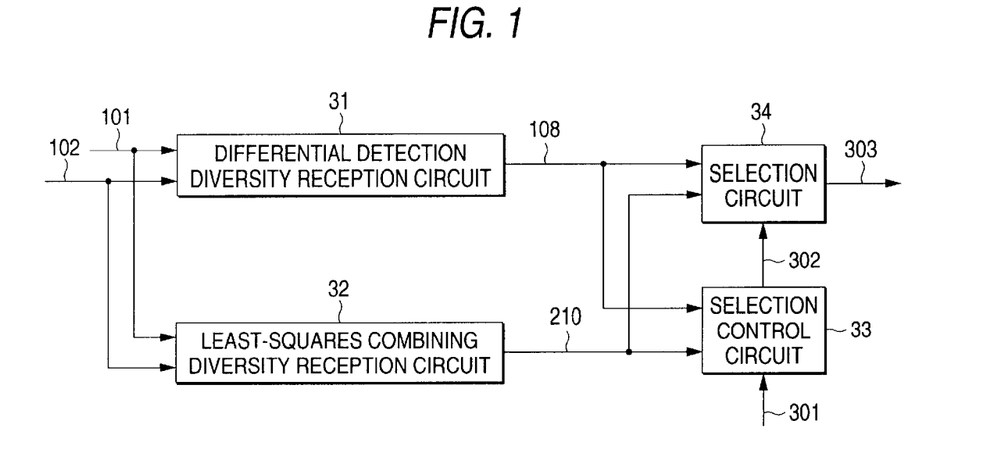
FIG. 1 is a block diagram for showing an arrangement of a diversity receiver according to an embodiment 1.

FIG. 1 is a schematic block diagram for indicating an arrangement of a diversity receiver according to an embodiment 1 of the present invention. In the drawing, reference numeral 31 shows a differential detection diversity reception circuit. The differential detection diversity reception circuit 31 performs the postdetection combining diversity reception with respect to the received baseband signals 101 and 102 such as differentially coded QPSK signals to thereby output the hard decision data 108.

Reference numeral 32 shows a least-squares combining diversity reception circuit. The least-squares combining diversity reception circuit 32 performs the least-squares combining diversity reception with respect to the received baseband signals 101 and 102 to thereby output a differentially decoded result 210 with respect to the hard decision data.

Reference numeral 33 represents a selection control circuit. The selection control circuit 33 compares a prerecognized reference signal 301 with the hard decision data 108 outputted from the differential detection diversity reception circuit 31 and also the differentially decoded result 210 outputted from the least-squares combining diversity reception circuit 32 to thereby produce a selection control signal 302 used to select one of the hard decision data 108 and the differentially decoded result 210.

Reference numeral 34 represents a selection circuit. The selection circuit 34 selects one of the hard decision data 108 outputted from the differential detection diversity reception circuit 31 and the differentially decoded result 210 outputted from the least-squares combining diversity reception circuit 32 in response to the selection control signal 302 outputted from the selection control circuit 33 to thereby output the selected data as demodulated data 303.

Next, operations of the diversity receiver will now be explained.

When the received baseband signals 101 and 102 are entered, the differential detection diversity reception circuit 31 performs the postdetection combining diversity reception to thereby output the hard decision data 108. Since the arrangement and the operation of the differential detection diversity reception circuit 31 are the same as those of the conventional differential detection diversity receiver (see FIG. 17), descriptions thereof are omitted.

Figure 2:
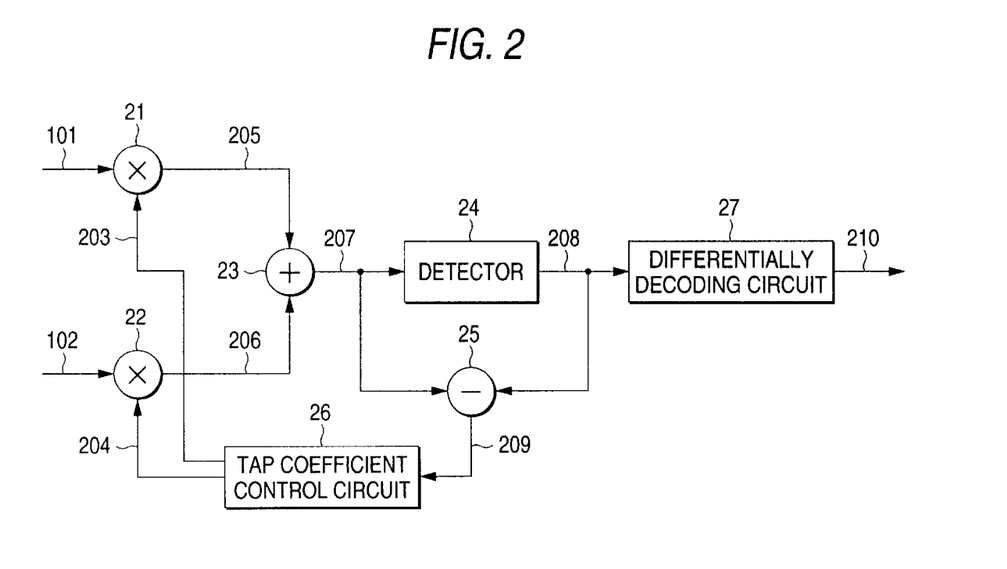
FIG. 2 is a block diagram for representing an internal arrangement of a least-squares combining diversity reception circuit employed in the embodiment 1.

When the received baseband signals 101 and 102 are inputted, the least-squares combining diversity reception circuit 32 controls a tap coefficient in such a manner that a mean square value of error signals can be reduced as small as possible. FIG. 2 is a schematic block diagram for showing an internal circuit arrangement of the least-squares combining diversity reception circuit 32. It should also be noted that the same reference numerals of the conventional least-squares combining diversity receiver (see FIG. 18) will be employed as those for indicating the same, or similar circuit elements of the least-squares combining diversity reception circuit 32, and therefore descriptions thereof are omitted. In the drawing, reference numeral 27 indicates a differentially decoding circuit and reference numeral 210 is a differentially decoded result.

Similar to the conventional least-squares combining diversity receiver, the least-squares combining diversity reception circuit 32 with employment of the above-described arrangement executes the hard decision with respect to soft decision data 207 obtained by least-squares combining the received baseband signals 101 and 102. The differentially decoding circuit 27 differentially decodes the hard decision data 208 to output a differentially decoded result 210.

As previously described, since the least-squares combining diversity reception circuit 32 differentially decodes the result obtained by the least-squares combining diversity reception, even when the co-channel interference components are contained in the received baseband signals 101 and 102, the least-squares combining diversity reception circuit 32 can mitigate the adverse influence. Furthermore, in the case that the differential coding operation is carried out on the transmission side, the least-squares combining diversity reception circuit 32 can output the demodulated data corresponding thereto.

Figure 3:
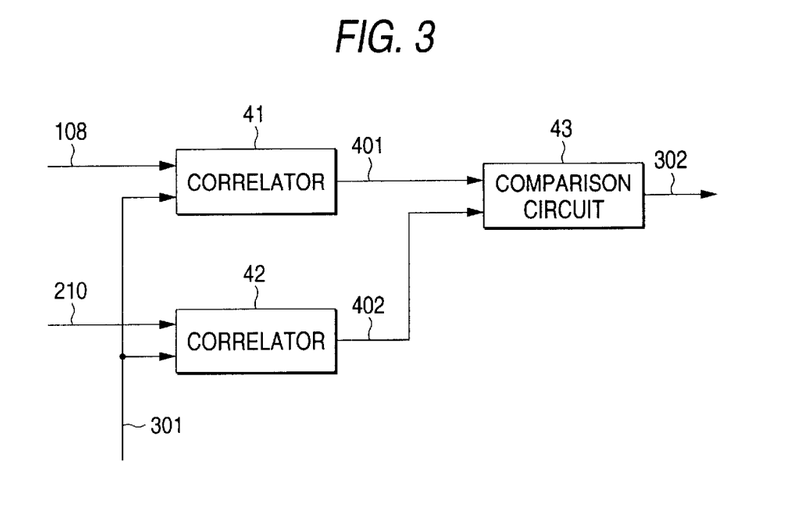
FIG. 3 is a block diagram for indicating an internal arrangement of a selection control circuit according to the embodiment 1.

Both the hard decision data 108 produced by the differential detection diversity reception circuit 31 and the differentially decoded result 210 produced by the least-squares combining diversity reception circuit 32 are transferred to the selection control circuit 33 and the selection circuit 34. The selection control circuit 33 compares the hard decision data 108 and the differentially decoded result 210 with the prerecognized reference signal 301 so as to output the selection control signal 302 used to select one of the hard decision data 108 and the differentially decoded result 210. FIG. 3 is a schematic block diagram for indicating an internal circuit arrangement of the selection control circuit 33. In the drawing, reference numerals 41 and 42 show correlators, reference numeral 43 indicates a comparison circuit, and reference numerals 401 and 402 represent correlation results.

In the selection control circuit 33 with employment of the above-explained circuit arrangement, the correlator 41 correlates the prerecognized reference signal 301 such as a unique word with a portion of the hard decision data 108, which corresponds to the reference signal 301, and then the coincident number is outputted as the correlation result 401. Another correlator 42 correlates the reference signal 301 with a portion of the differentially decoded result 210, which corresponds to the reference signal 301, and then the coincident number is outputted as the correlation result 402. The comparison circuit 43 compares the correlation result 401 with the correlation result 402, and then outputs the selection control signal 302 so as to control such that the output of the larger coincident number is selected.

The selection control signal 302 produced by the selection control circuit 33 shown in FIG. 1 is sent to the selection circuit 34. In response to the selection control signal 302, the selection circuit 34 selects one of the hard decision data 108 outputted from the differential detection diversity reception circuit 31 and the differentially decoded result 210 outputted from the least-squares combining diversity reception circuit 32, and then outputs the selected data as the demodulated data 303.

As previously explained, in accordance with the diversity receiver of the embodiment 1, since one of the hard decision data outputted from the differential detection diversity reception circuit and the differentially decoded result outputted from the least-squares combining diversity reception circuit is selected based upon the results correlated with the reference signal, it is possible to achieve the better performance even when the fading phenomenon is rapidly changed, and even under such a condition that the co-channel interference is present.

(EMBODIMENT 2)

Figure 4:
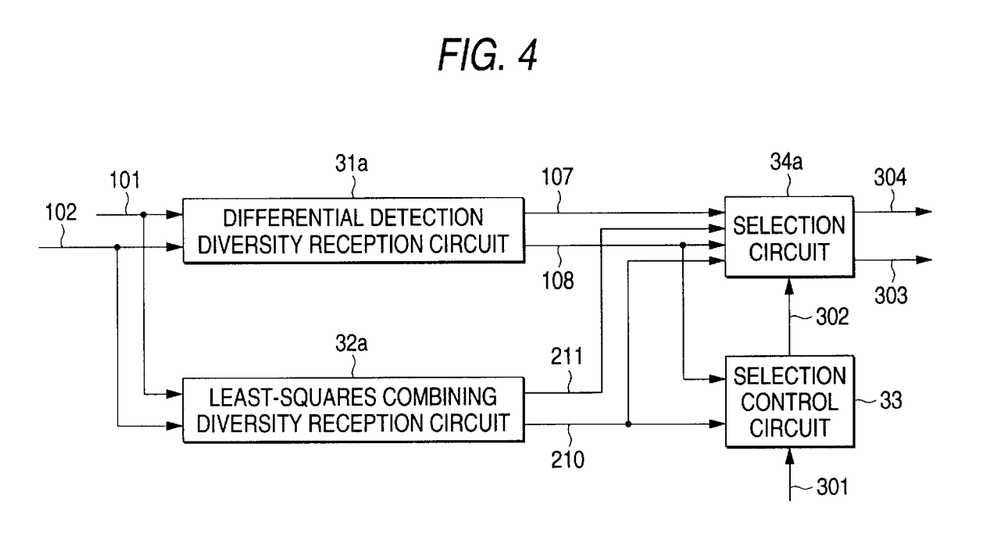
FIG. 4 is a block diagram for showing an arrangement of a diversity receiver according to an embodiment 2 of the present invention.

FIG. 4 is a schematic block diagram for showing a circuit arrangement of a diversity receiver according to an embodiment 2 of the present invention. It should be noted that the same reference numerals of the embodiment 1 shown in FIG. 1 will be employed as those for denoting the same, or similar circuit elements and data of this embodiment 2. In the drawing, reference numeral 31a indicates a differential detection diversity reception circuit. The differential detection diversity reception circuit 31a performs the postdetection combining diversity reception with respect to the received baseband signals 101 and 102 such as differentially coded QPSK signals to thereby output the soft decision data 107 together with the hard decision data 108.

Reference numeral 32a shows a least-squares combining diversity reception circuit. The least-squares combining diversity reception circuit 32a performs the least-squares combining diversity reception with respect to the received baseband signals 101 and 102 to thereby output reliability information 211 obtained from the soft decision data in combination with a differentially decoded result 210.

Reference numerals 34a represents a selection circuit. The selection circuit 34a selects one of the soft decision data 107/hard decision data 108 outputted from the differential detection diversity reception circuit 31a and the reliability information 304/differentially decoded result 210 outputted from the least-squares combining diversity reception circuit 32a in response to the selection control signal 302 outputted from the selection control circuit 33 to thereby output the selected data as the selected reliability information 304/ demodulated data 303.

Next, operations of the diversity receiver will now be explained.

Figure 5:
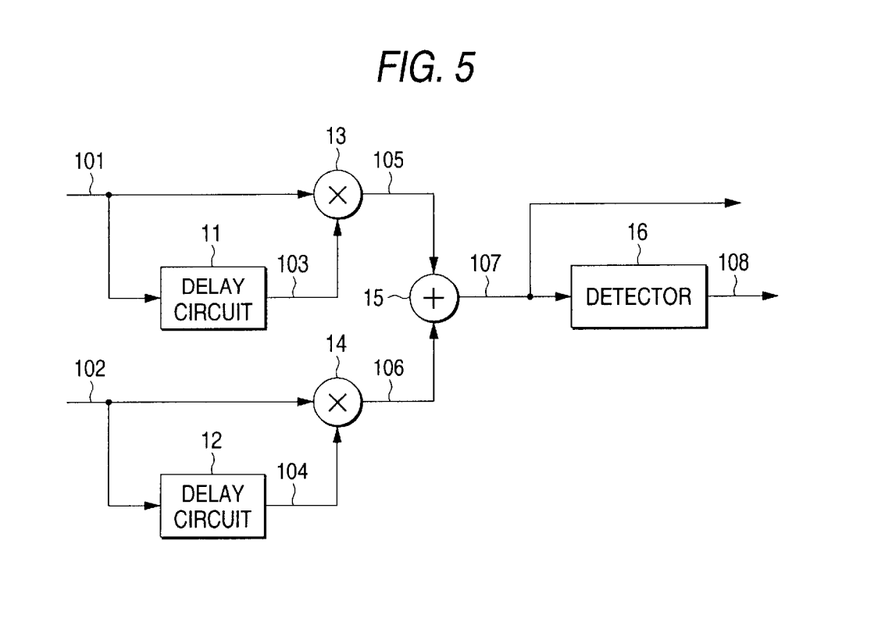
FIG. 5 is a block diagram for representing an internal arrangement of a differential detection diversity reception circuit according to the embodiment 2.

When the received baseband signals 101 and 102 are entered, the differential detection diversity reception circuit 31a performs the postdetection combining diversity reception to thereby output the soft decision data 107 and the hard decision data 108. FIG. 5 is a schematic block diagram for indicating an internal circuit arrangement of the differential detection diversity reception circuit 31a. It should be understood that the same reference numerals employed in the conventional differential detection diversity receiver (see FIG. 17) will be used as those for denoting the same, or similar circuit elements of the differential detection diversity reception circuit 31a, and descriptions thereof are omitted. The differential detection diversity reception circuit 31a owns such a different point. That is, the soft decision data 107 obtained by diversity-combining the differential detection results is outputted in combination with the hard decision data 108.

Similar to the conventional differential detection diversity receiver, the differential detection diversity reception circuit 31a with employment of the above-described circuit arrangement performs the hard decision with respect to the soft decision data 107 which is obtained by diversity-combining the differential detection results as to the received baseband signals 101 and 102. Then, the differential detection diversity reception circuit 31a outputs the soft decision data 107 in combination with the hard decision data 108.

As previously described, since the differential detection diversity reception circuit 31a further outputs the soft decision data 107 obtained by diversity-combining the differential detection results in combination with the hard decision data 108, the error correction unit in the post stage can perform the soft decision decoding for the encoded data on the transmission side, and can improve the performance after the error correction.

Figure 6:
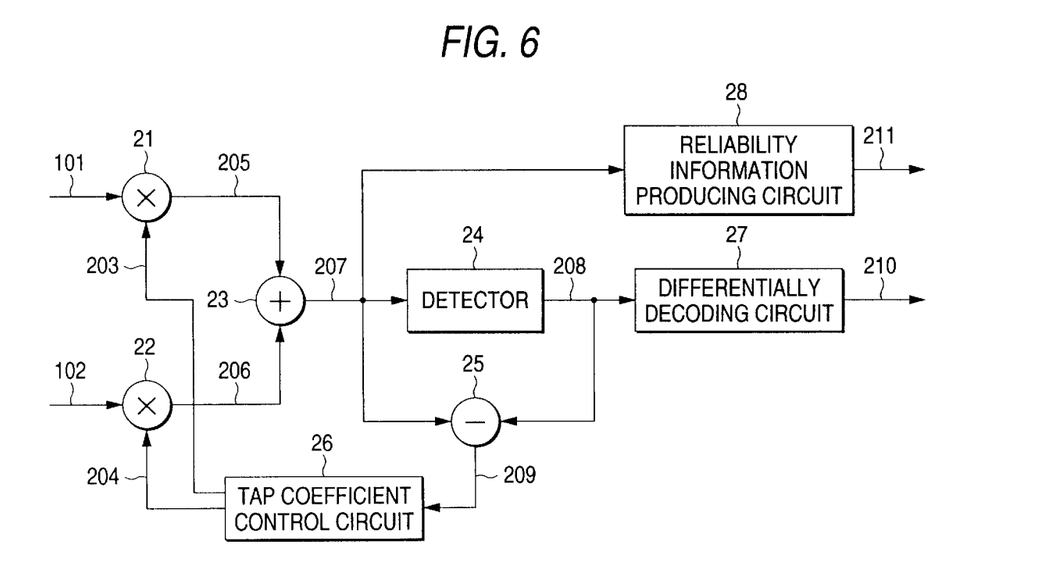
FIG. 6 is a block diagram for denoting an internal arrangement of a least-squares combining diversity reception circuit according to the embodiment 2.

When the received baseband signals 101 and 102 are inputted, the least-squares combining diversity reception circuit 32a performs the least-squares combining diversity reception to thereby output the reliability information 211 and the differentially decoded result 210. FIG. 6 is a schematic block diagram for showing an internal circuit arrangement of the least-squares combining diversity reception circuit 32a. It should also be noted that the same reference numerals of the least-squares combining diversity reception circuit of the embodiment 1 (see FIG. 2) will be employed as those for indicating the same, or similar circuit elements of the least-squares combining diversity reception circuit 32a, and therefore descriptions thereof are omitted. In the drawing, reference numeral 28 indicates a reliability information producing circuit, and reference numeral 211 denotes reliability information.

Figure 7:
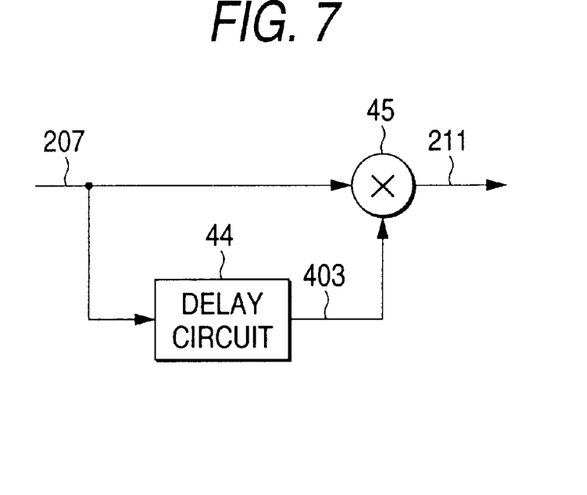
FIG. 7 is a block diagram for representing an internal arrangement of a reliability information producing circuit employed in the least-squares combining diversity reception circuit of the embodiment 2.

Similar to the least-squares combining diversity reception circuit of the embodiment 1, the least-squares combining diversity reception circuit 32a with employment of the above-described arrangement executes the hard decision with respect to soft decision data 207 obtained by least-squares combining the received baseband signals 101 and 102. Then, the least-squares combining diversity reception circuit 32a differentially decodes the hard decision data 208 to thereby output the differentially decoded result 210. When the soft decision data 207 is inputted, the reliability information producing circuit 28 produces the reliability information 211 used to execute the soft decision decoding in the error correction unit provided at the post stage, and outputs the reliability information 211. FIG. 7 is a schematic block diagram for showing an internal circuit arrangement of the reliability information producing circuit 28. In the drawing, reference numeral 44 shows a delay circuit, reference numeral 45 indicates a multiplier, and reference numeral 403 represents soft decision data before 1 symbol.

In the reliability information producing circuit 28 with employment of the above-described circuit arrangement, the delay circuit 44 delays the soft decision data 207 by time corresponding to 1 symbol, and then outputs the delayed data as soft decision data 403 before 1 symbol. The multiplier 45 performs the complex multiplication between the soft decision data 207 and the soft decision data 403 before 1 symbol to thereby output the reliability information 211.

As previously explained, since the least-squares combining diversity reception circuit 32a further outputs the reliability information 211 obtained from the soft decision data 207 in combination with the differentially decoded result 210, the error correction unit in the post stage can perform the soft decision decoding with respect to the encoded data on the transmission side, and can improve the performance after the error correction.

The soft decision data 107 produced from the differential detection diversity reception circuit 31a is sent to the selection circuit 34a, and the hard decision data 108 is sent to both the selection circuit 34a and the selection control circuit 33. Also, the reliability information 211 produced from the least-squares combining diversity reception circuit 32a is supplied to the selection circuit 34a, and the differentially decoded result 210 is supplied to both the selection circuit 34a and the selection control circuit 33.

Similar to the embodiment 1, the selection control circuit 33 correlates the hard decision data 108 and the differentially decoded result 210 with the reference signal 301 to thereby output the selection control signal 302. The selection control signal 302 controls to select one of the soft decision data 107/hard decision data 108 outputted from the differential detection diversity reception circuit 31a and the reliability information 211/differentially decoded result 210 outputted from the least-squares combining diversity reception circuit 32a based upon the dimension of the coincident symbol number.

The selection control signal 302 produced from the selection control circuit 33 is sent to a selection circuit 34a. In response to the selection control signal 302, the selection circuit 34a selects one of the soft decision data 107/hard decision data 108 outputted from the differential detection diversity reception circuit 31a and the reliability information 211/differentially decoded result 210 outputted from the least-squares combining diversity reception circuit 32a, and then outputs the selected data as the reliability information 304/demodulated data 303.

Figure 8:
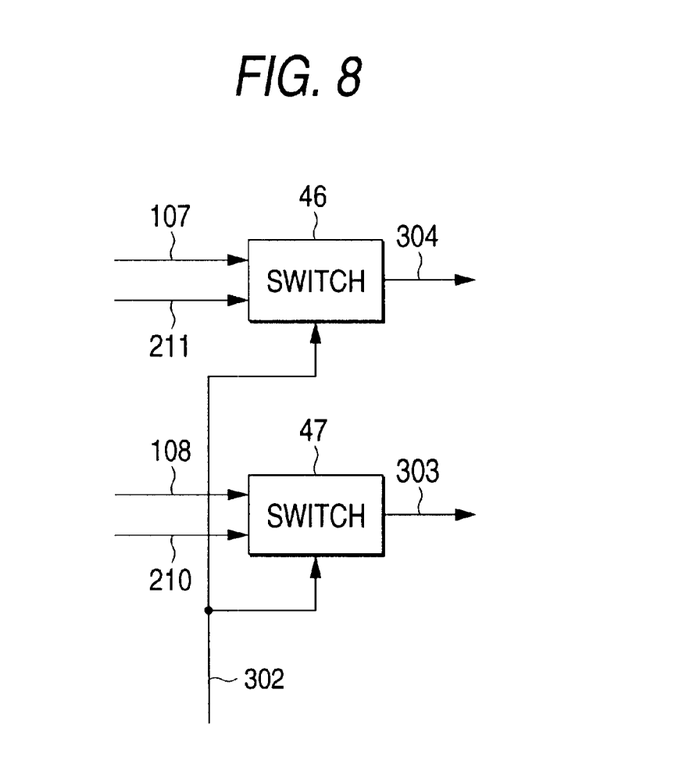
FIG. 8 is a block diagram for indicating an internal arrangement of a selection circuit according to the embodiment 2.

FIG. 8 is a schematic block diagram for showing an internal circuit arrangement of the selecting circuit 34a. In the drawing, reference numerals 46 and 47 are switches. The switch 46 selects one of the soft decision data 107 outputted from the differential detection diversity reception circuit 31a and the reliability information 211 outputted from the least-squares combining diversity reception circuit 32a in response to the selection control signal 302, and then outputs the selected data as the selected reliability information 304. Also, the switch 47 selects one of the hard decision data 108 outputted from the differential detection diversity reception circuit 31a and the differentially decoded result 210 outputted from the least-squares combining diversity reception circuit 32a in response to the selection control signal 302, and then outputs the selected data as the demodulated data 303.

As previously described, in accordance with the embodiment 2, since one of the soft decision data outputted from the differential detection diversity reception circuit and the reliability information outputted from the least-squares combining diversity reception circuit, is selected, the data which has been encoded on the transmission side for the error correction can be processed by the soft decision decoding, so that the performance after the error correction can be improved as compared with that of the embodiment 1.

(EMBODIMENT 3)

Figure 9:
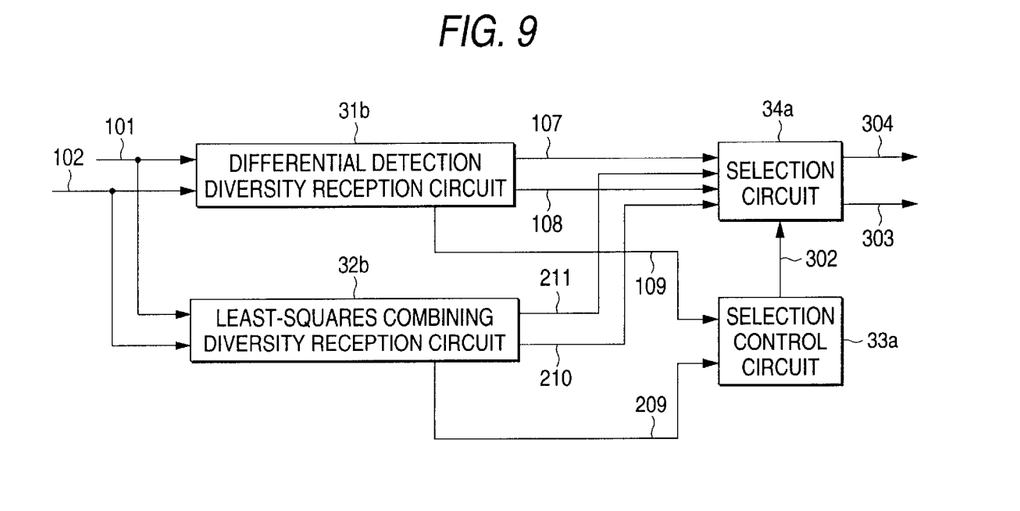
FIG. 9 is a block diagram for showing an arrangement of a diversity receiver according to an embodiment 3 of the present invention.

FIG. 9 is a schematic block diagram for showing a circuit arrangement of a diversity receiver according to an embodiment 3 of the present invention. It should be noted that the same reference numerals of the embodiment 2 shown in FIG. 4 will be employed as those for denoting the same, or similar circuit elements and the data of the embodiment 3.

In the drawing, reference numeral 31b indicates a differential detection diversity reception circuit. The differential detection diversity reception circuit 31b performs the post-detection combining diversity reception with respect to the received baseband signals 101 and 102 such as differentially coded QPSK signals to thereby further output an error signal 109 equal to a difference between the hard decision data 108 and the soft decision data 107 together with the soft decision data 107 and the hard decision data 108.

Reference numeral 32b shows a least-squares combining diversity reception circuit. The least-squares combining diversity reception circuit 32b performs the least-squares combining diversity reception with respect to the received baseband signals 101 and 102 to further thereby output an error signal 209 equal to a difference between the soft decision data and the hard decision data together with both the reliability information 211 and the differentially decoded result 210.

Reference numeral 33a represents a selection control circuit. The selection control circuit 33a produces a selection control signal 302 used to select one of the soft decision data 107/hard decision data 108 outputted from the differential detection diversity reception circuit 31b and the reliability information 211/differentially decoded result 210 outputted from the least-squares combining diversity reception circuit 32b based upon such a fact as to whether a square mean value of the error signal 109 outputted from the differential detection diversity reception circuit 31b is larger than a square mean value of the error signal 209 outputted from the least-squares combining diversity reception circuit 32b.

Next, operations of the diversity receiver will now be explained.

Figure 10:
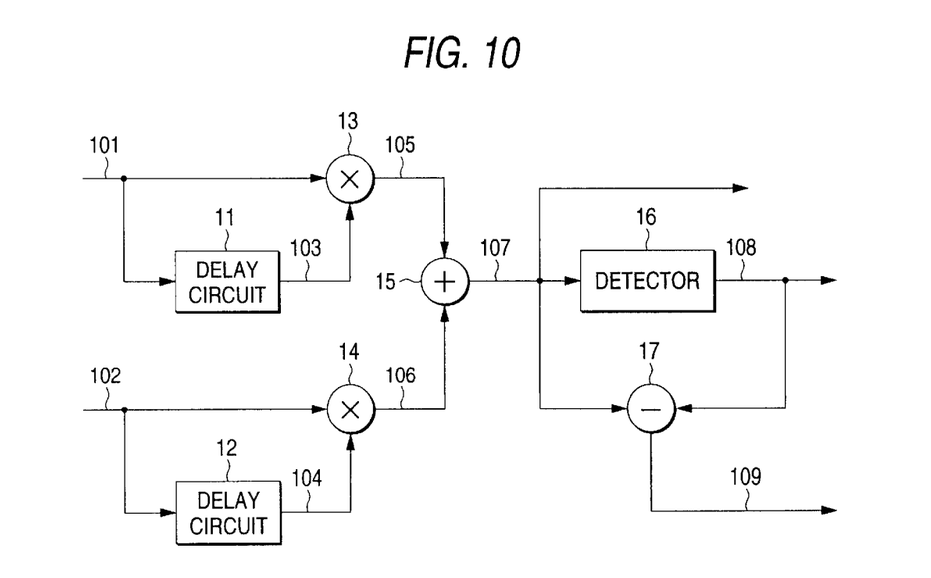
FIG. 10 is a block diagram for representing an internal arrangement of a differential detection diversity reception circuit according to the embodiment 3.

When the received baseband signals 101 and 102 are entered, the differential detection diversity reception circuit 31b performs the postdetection combining diversity reception to thereby output the hard decision data 108 and the soft decision data 107, and further the error signal 109 equal to the difference between the soft decision data 107 and the hard decision data 108. FIG. 10 is a schematic block diagram for indicating an internal circuit arrangement of the differential detection diversity reception circuit 31b. It should be understood that the same reference numerals employed in the differential detection diversity reception circuit of the embodiment 2 (see FIG. 5) will be used as those for denoting the same, or similar circuit elements of the differential detection diversity reception circuit 31b, and descriptions thereof are omitted. In the drawing, reference numeral 17 is a subtracter, and reference numeral 109 shows an error signal.

Similar to the differential detection diversity reception circuit of the embodiment 2, the differential detection diversity reception circuit 31b with employment of the above-described circuit arrangement outputs the hard decision 108 and the soft decision 107. The soft decision data 107 is obtained by diversity-combining the differential detection results with respect to the received baseband signals 101 and 102. The hard decision data 108 is obtained by performing the hard decision with respect to the soft decision data 107. The subtracter 17 executes the complex subtraction between the soft decision data 107 and the hard decision data 108 to output the error signal 109.

As previously explained, since the differential detection diversity reception circuit 31b outputs the soft decision data 107, the hard decision data 108, and further the error signal 109, it is possible to predict the reliability of the soft decision data 107/hard decision data 108 outputted from the differential detection diversity reception circuit 31b based on the error signal 109.

Figure 11:
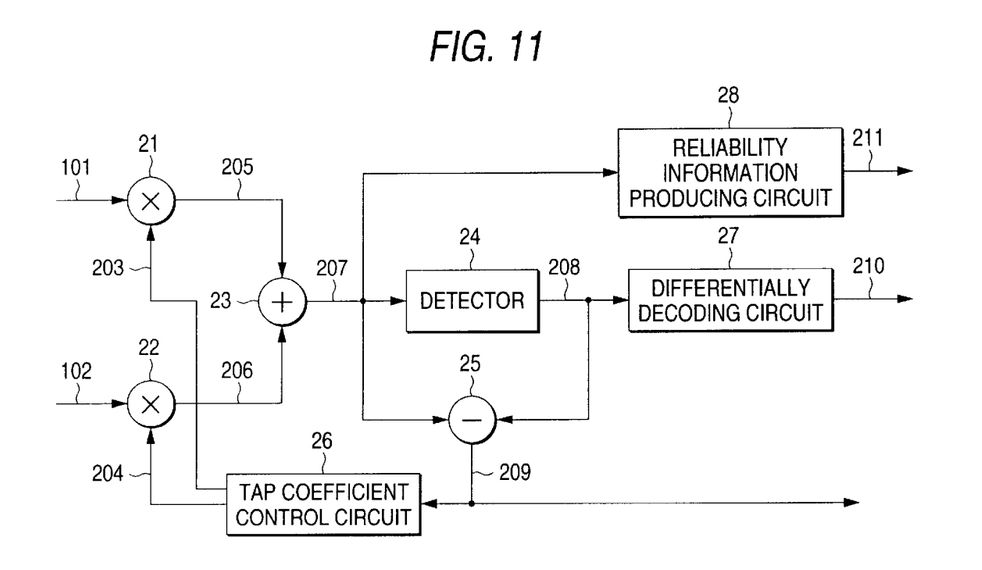
FIG. 11 is a block diagram for showing an internal arrangement of a least-squares combining diversity reception circuit employed in the embodiment 3.

When the received baseband signals 101 and 102 are inputted, the least-squares combining diversity reception circuit 32b performs the least-squares combining diversity reception to thereby output the reliability information 211 and the differentially decoded result 210, and further the error signal 209 equal to the difference between the soft decision data and the hard decision data. FIG. 11 is a schematic block diagram for showing an internal circuit arrangement of the least-squares combining diversity reception circuit 32b. It should also be noted that the same reference numerals of the least-squares combining diversity reception circuit of the embodiment 2 (see FIG. 6) will be employed as those for indicating the same, or similar circuit elements of the least-squares combining diversity reception circuit 32b, and therefore descriptions thereof are omitted. The least-squares combining diversity reception circuit 32b owns such a different point that the error signal 209 equal to the difference between the soft decision data 207 and the hard decision data 208 is further outputted in combination with the reliability information 211 and the differentially decoded result 210.

Similar to the least-squares combining diversity reception circuit of the embodiment 2, the least-squares combining diversity reception circuit 32b with employment of the above-described arrangement executes the hard decision with respect to the soft decision data 207 obtained by least-squares combining the received baseband signals 101 and 102. Thus, the least-squares combining diversity reception circuit 32b outputs the differentially decoded result 210 produced by differentially decoding the hard decision data 208, the reliability information 211 obtained from the soft decision data 207, and further the error signal 209 equal to the difference between the soft decision data 207 and the hard decision data 208.

As previously explained, since the least-squares combining diversity reception circuit 32b outputs the reliability information 211, the differentially decoded result 210, and further the error signal 209, it is possible to predict the reliability of the reliability information 211/differentially decoded result 210 outputted from the least-squares combining diversity reception circuit 32b based upon the error signal 209.

The soft decision data 107/hard decision data 108 outputted from the differential detection diversity reception circuit 31b are sent to the selection circuit 34a, and the error signal 109 is sent to the selection control circuit 33a. Also, the reliability information 211/differentially decoded result 210 outputted from the least-squares combining diversity reception circuit 32b are sent to the selection circuit 34a, and the error signal 209 is sent to the selection control circuit 33a.

Figure 12:
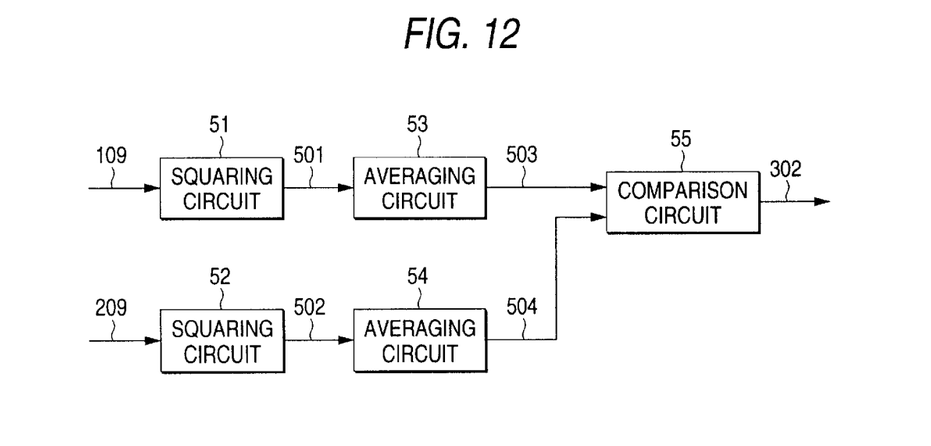
FIG. 12 is a block diagram for indicating an internal arrangement of a selection control circuit employed in the embodiment 3.

The selection control circuit 33a produces the selection control signal 302 used to select one of the soft decision data 107/hard decision data 108 outputted from the differential detection diversity reception circuit 31b and the reliability information 211/differentially decoded result 210 outputted from the least-squares combining diversity reception circuit 32b based upon such a fact as to whether the square mean value of the error signal 109 outputted from the differential detection diversity reception circuit 31b is larger than the square mean value of the error signal 209 outputted from the least-squares combining diversity reception circuit 32b. FIG. 12 is a schematic block diagram for showing an internal circuit arrangement of the selection control circuit 33a. In the drawing, reference numerals 51 and 52 show squaring circuits, reference numerals 53 and 54 indicate averaging circuits, and reference numeral 55 represents a comparison circuit. Also, reference numerals 501 and 502 are squared errors, and reference numerals 503 and 504 show square mean values of error signals.

In the selection control circuit 33a with employment of the above-described circuit arrangement, the squaring circuit 51 squares the error signal 109 outputted from the differential detection diversity reception circuit 31b to thereby output the squared error 501, whereas the averaging circuit 53 averages the squared error 501 during a certain time period to thereby output the square mean value 503 of the error signals. Also, the squaring circuit 52 squares the error signal 209 outputted from the least-squares combining diversity reception circuit 32b to thereby output the squared error 502, whereas the averaging circuit 54 averages the squared error 502 during a certain time period to thereby output the square mean value 504 of the error signals. Also, the comparison circuit 55 compares the square mean value 503 of the error signals with the square mean value 504 of the error signals to thereby output the selection control signal 302 used to select the output which has the smaller square mean value of the error signals.

The selection control signal 302 produced from the selection control circuit 33a is sent to the selection circuit 34a. Similar to the embodiment 2, the selection circuit 34a selects one of the soft decision data 107/hard decision data 108 outputted from the differential detection diversity reception circuit 31b and the reliability information 211/differentially decoded result 210 outputted from the least-squares combining diversity reception circuit 32b in response to the selection control signal 302. Then, the selection circuit 34a outputs the selected data as the selected reliability information 304/demodulated data 303.

As previously described, in accordance with the embodiment 3, one of the output from the differential detection diversity reception circuit and the output from the least-squares combining diversity reception circuit is selected, based upon such a fact as to whether or not the square mean value of the error signals is larger than that of the other error signals. As a result, the output can be selected not only in unit of 1 burst, but also in unit of several symbols. Therefore, the performance of this embodiment 3 can be further improved rather than that of the embodiment 2.

(EMBODIMENT 4)

Figure 13:
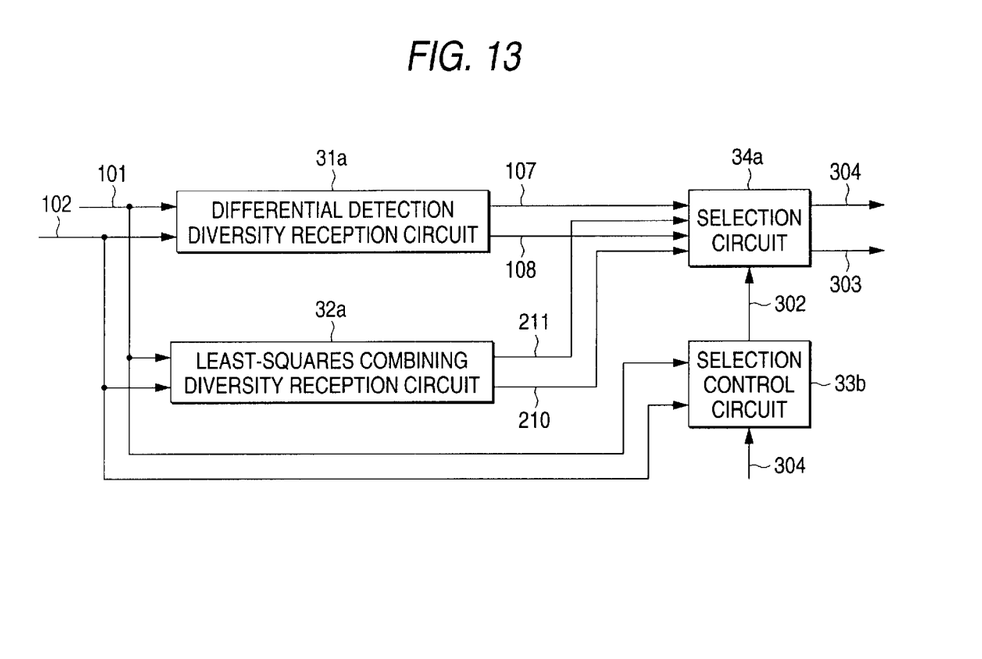
FIG. 13 is a block diagram for representing an arrangement of a diversity receiver according to an embodiment 4 of the present invention.

FIG. 13 is a schematic block diagram for showing a circuit arrangement of a diversity receiver according to an embodiment 4 of the present invention. It should be noted that the same reference numerals of the embodiment 2 shown in FIG. 4 will be employed as those for denoting the same, or similar circuit elements and data of this embodiment 4.

In the drawing, reference numerals 33b indicates a selection control circuit. When the received baseband signals 101, 102, and a threshold 304 are inputted, the selection control circuit 33b produces a selection control signal 302 used to select one of the soft decision data 107/hard decision data 108 outputted from the differential detection diversity reception circuit 31a and the reliability information 211/ differentially decoded result 210 outputted from the least-squares combining diversity reception circuit 32a based upon a fading pitch detected from the received baseband signals 101 and 102.

Next, operations of the diversity receiver will now be explained.

Similar to the embodiment 2, when the received baseband signals 101 and 102 are entered, the differential detection diversity reception circuit 31a performs the postdetection combining diversity reception to thereby output the hard decision data 108 and the soft decision data 107. Similar to the embodiment 2, when the received baseband signals 101 and 102 are inputted, the least-squares combining diversity reception circuit 32a performs the least-squares combining diversity reception to thereby output the reliability information 211 and the differentially decoded result 210. Both the soft decision data 107/hard decision data 108 produced by the differential detection diversity reception circuit 31a and the reliability information 211/differentially decoded result 210 produced by the least-squares combining diversity reception circuit 32a are sent to the selection circuit 34a.

Figure 14:
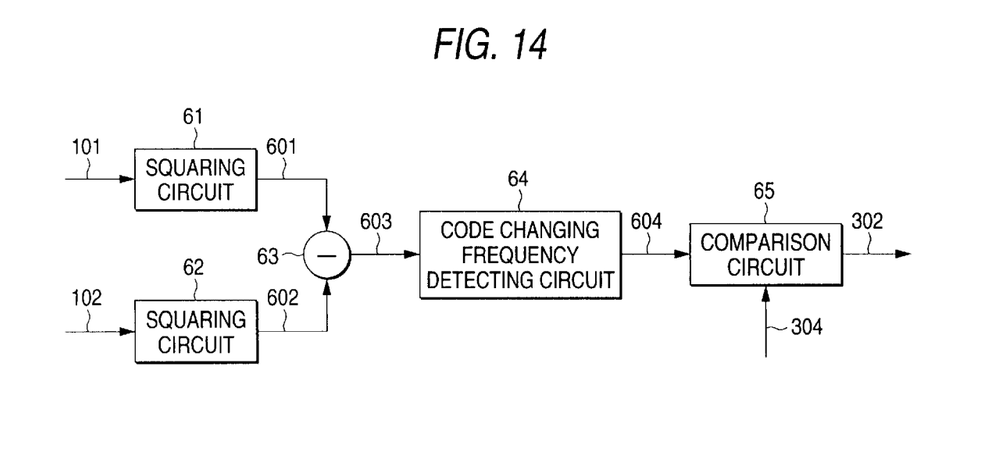
FIG. 14 is a block diagram for indicating an internal arrangement of a selection control circuit employed in the embodiment 4.

The selection control circuit 33b detects the fading pitch from the received baseband signals 101 and 102, and further produces a selection control signal 302 used to control such a selection. That is, when the fading phenomenon is quickly varied, the soft decision data 107/hard decision data 108 outputted from the differential detection diversity reception circuit 31a are selected. When the fading phenomenon is slowly varied, the reliability information 211/differentially decoded result 210 outputted from the least-squares combining diversity reception circuit 32a are selected. FIG. 14 is a schematic block diagram for representing an internal circuit arrangement of the selection control circuit 33b. In the drawing, reference numerals 61 and 62 are squaring circuits, reference numeral 63 indicates a subtracter, and reference numeral 64 is a code changing frequency detecting circuit, reference numeral 65 shows a comparison circuit. Also, reference numerals 601 and 602 indicate received signal power, reference numeral 603 shows a received signal power difference, and reference numeral 604 represents a code changing frequency.

In the selection control circuit 33b with employment of the above-explained circuit arrangement, the squaring circuit 61 squares the received baseband signal 101 of the branch 1 to output the received signal power 601, whereas the squaring circuit 62 squares the received baseband signal 102 of the branch 2 to output the received signal power 602. The subtracter 63 subtracts the received signal power 601 from the received signal power 602 to output the difference between these received signal power as the received signal power difference 603. The code changing frequency detecting circuit 64 detects the code changing frequency of the received signal power difference 603 to output the code changing frequency 604. The comparison circuit 65 compares the code changing frequency 604 with the predetermined threshold 304. When the code changing frequency 604 is larger than the threshold 304, the comparison circuit 65 judges that the fading phenomenon is quickly varied to thereby select the output from the differential detection diversity reception circuit 31a. Conversely, when the code changing frequency 604 is smaller than the threshold 304, the comparison circuit 65 judges that the fading phenomenon is slowly varied to thereby select the output from the least-squares combining diversity reception circuit 32a. The comparison circuit 65 outputs such a selection control signal 302 used to select the above-described outputs.

The selection control signal 302 produced from the selection control circuit 33b shown in FIG. 13 is sent to the selection circuit 34a. Similar to the embodiment 2, the selection circuit 34a selects one of the soft decision data 107/hard decision data 108 outputted from the differential detection diversity reception circuit 31b and the reliability information 211/differentially decoded result 210 outputted from the least-squares combining diversity reception circuit 32b in response to the selection control signal 302, and then outputs the selected data as the selected reliability information 304/demodulated data 303.

As previously described, in accordance with the embodiment 4, the fading pitch is detected from the received baseband signal of each branch. When the fading phenomenon is quickly varied, the output from the differential detection diversity reception circuit is selected. When the fading phenomenon is slowly varied, the output from the least-squares combining diversity reception circuit is selected. As a consequence, the diversity receiver can solve such a drawback of the least-squares combining diversity reception. That is, when the fading phenomenon is quickly varied, the performance is deteriorated.

(EMBODIMENT 5)

Figure 15:
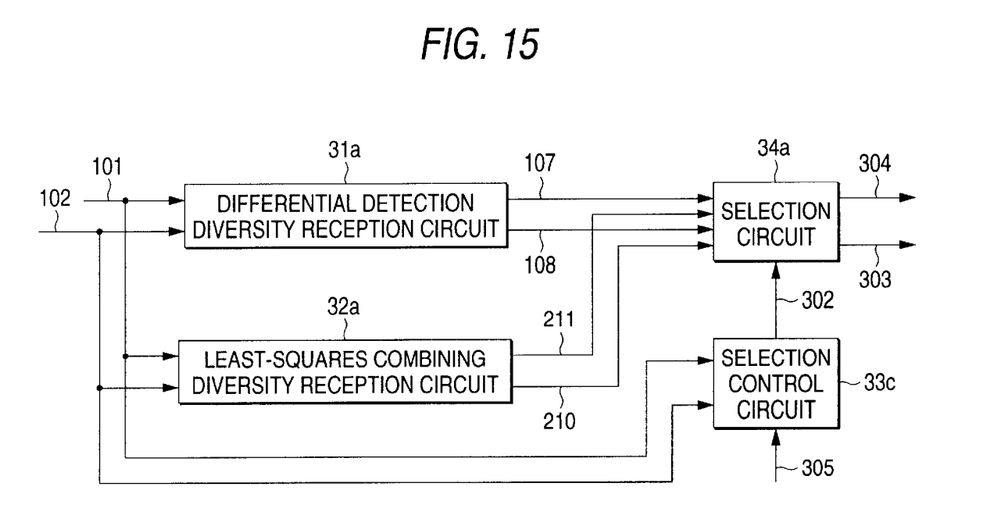
FIG. 15 is a block diagram for representing an arrangement of a diversity receiver according to an embodiment 5 of the present invention.

FIG. 15 is a schematic block diagram for showing a circuit arrangement of a diversity receiver according to an embodiment 5 of the present invention. It should be noted that the same reference numerals of the embodiment 2 shown in FIG. 4 will be employed as those for denoting the same, or similar circuit elements and data of this embodiment 5.

In the drawing, reference numeral 33c represents a selection control circuit. When the received baseband signals 101 and 102, and also a threshold 305 are inputted, the selection control circuit 33c produces a selection control signal 302 used to select one of the soft decision data 107/hard decision data 108 outputted from the differential detection diversity reception circuit 31a and the reliability information 211/differentially decoded result 210 outputted from the least-squares combining diversity reception circuit 32a based upon received signal power calculated from the received baseband signals 101 and 102.

Next, operations of the diversity receiver will now be explained.

Similar to the embodiment 2, when the received baseband signals 101 and 102 are entered, the differential detection diversity reception circuit 31 performs the postdetection combining diversity reception to thereby output the hard decision data 108, and the soft decision data 107. Similar to the embodiment 2, when the received baseband signals 101 and 102 are inputted, the least-squares combining diversity reception circuit 32a preforms the least-squares combining diversity reception to thereby output the reliability information 211 and the differentially decoded result 210. Both the soft decision data 107/hard decision data 108 produced by the differential detection diversity reception circuit 31a and the reliability information 211/differentially decoded result 210 produced by the least-squares combining diversity reception circuit 32a are sent to the selection circuit 34a.

The selection control circuit 33c calculates received signal power from the received baseband signals 101 and 102. The selection control circuit 33c produces a selection control signal 302 used to control such a selection. That is, when the received signal power is high, the soft decision data 107/hard decision data 108 outputted from the differential detection diversity reception circuit 31a are selected, and when the received signal power is low, the reliability information 211/differentially decoded result 210 outputted from the least-squares combining diversity reception circuit 32a are selected.

Figure 16:
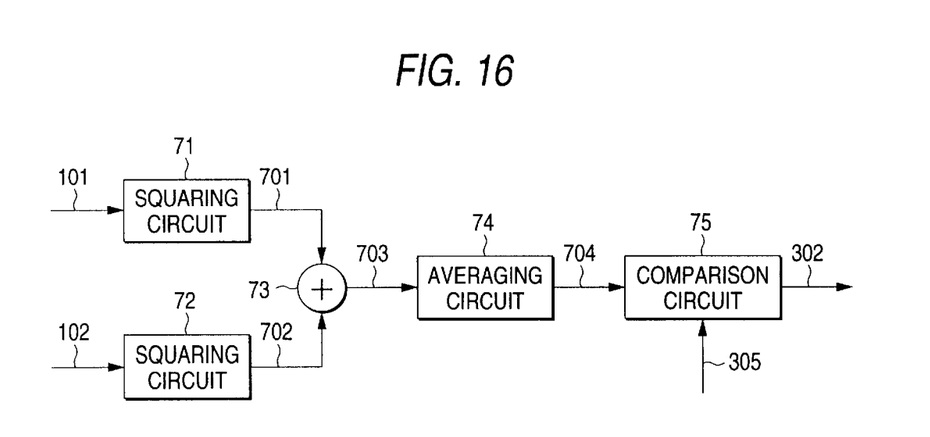
FIG. 16 is a block diagram for indicating an internal arrangement of a selection control circuit employed in the embodiment 5.

FIG. 16 is a schematic block diagram for showing an internal circuit arrangement of the selection control circuit 33c. In the drawing, reference numerals 71 and 72 show squaring circuits, reference numeral 73 indicates an adder, reference numeral 74 denotes an averaging circuit, reference number 75 represents a comparison circuit. Also, reference numerals 701 and 702 are received signal power, reference numeral 703 indicates a sum of received signal powers, and reference numeral 704 is an average value of received signal power sums.

In the selection control circuit 33c with employment of the above-explained circuit arrangement, the squaring circuit 71 squares the received baseband signal 101 of the branch 1 to output the received signal power 101, whereas the squaring circuit 72 squares the received baseband signal 102 of the branch 2 to output the received signal power 702. The adder 73 adds the received signal power 701 to the received signal power 702 to output the sum 703 of the received signal powers. The averaging circuit 74 averages the sum 703 of the received signal powers for a certain time period to thereby output the average value 704 of the received signal power sums. The comparison circuit 75 compares the average value 704 of the received signal power sums with the predetermined threshold 305. This comparison circuit 75 produces a selection control signal 302 used to control such a selection. That is, when the average value 704 of the received signal power sums is larger than the threshold 305, the comparison circuit 75 judges that the received signal power is high to thereby select the output of the differential detection diversity reception circuit 31a. When the average value 704 of the received signal power sums is smaller than the threshold 305, the comparison circuit 75 judges that the received signal power is low to thereby select the output of the least-squares combining diversity reception circuit 32a.

The selection control signal 302 produced from the selection control circuit 33c shown in FIG. 15 is sent to the selection circuit 34a. Similar to the embodiment 2, the selection circuit 34a selects one of the soft decision data 107/hard decision data 108 outputted from the differential detection diversity reception circuit 31b and the reliability information 211/differentially decoded result 210 outputted from the least-squares combining diversity reception circuit 32b in response to the selection control signal 302, and then outputs the selected data as the selected reliability information 304/demodulated data 303.

As previously described, in accordance with the embodiment 5, the received signal power is calculated from the received baseband signal of each branch. When the received signal power is high, the output from the differential detection diversity reception circuit is selected. When the received signal power is low, the output from the least-squares combining diversity reception circuit is selected. As a consequence, the diversity receiver can solve such a drawback of the least-squares combining diversity reception. That is, when the received signal power is high, the floor errors may occur.

What is claimed is:

1. A diversity receiver comprising:

a differential detection diversity reception circuit for performing a diversity reception with employment of a differential detection upon receipt of received signals of plural branches to thereby output hard decision data thereof;

a least-squares combining diversity reception circuit for performing a least-squares combining diversity reception upon receipt of the received signals of said plural branches to thereby output differentially decoded result of hard decision data;

a selection control circuit for producing a selection control signal used to select one of said hard decision data outputted from said differential detection diversity reception circuit and the differentially decoded result outputted from said least-squares combining diversity reception circuit based upon a predetermined selection basis; and a selection circuit for selecting one of said hard decision data and said differentially decoded result based upon said selection control signal by receiving said hard decision data outputted from said differential detection diversity reception circuit, said differentially decoded result outputted from said least-squares combining diversity reception circuit, and also said selection control signal outputted from said selection control circuit.

2. A diversity receiver as claimed in claim 1 wherein:

said differential detection diversity reception circuit outputs soft decision data in combination with the hard decision data;

said least-squares combining diversity reception circuit outputs reliability information obtained from the soft decision data in combination with the differentially decoded result;

said selection control circuit produces a selection control signal used to select one of said soft decision data/hard decision data outputted from said differential detection diversity reception circuit and said reliability information/differentially decoded result outputted from said least-squares combining diversity reception circuit based upon a predetermined selection basis; and said selection circuit selects one of said soft decision data/hard decision data outputted from said differential detection diversity reception circuit and also said reliability information/differentially decoded result outputted from said least-squares combining diversity reception circuit based upon said selection control signal by receiving said hard decision data/soft decision data outputted from said differential detection diversity reception circuit, said reliability information/differentially decoded result outputted from said least-squares combining diversity reception circuit, and also said selection control signal outputted from said selection control circuit.

3. A diversity receiver as claimed in claim 2 wherein:

while receiving said hard decision data outputted from said differential detection diversity reception circuit, said differentially decoded result outputted from said least-squares combining diversity reception circuit, and further a prerecognized reference signal, said selection control circuit calculates a correlation among said reference signal and a portion of said hard decision data, corresponding to said reference signal; a portion of said differentially decoded result, corresponding to said reference signal; and said selection control circuit produces said selection control signal used to select one of said soft decision data/hard decision data outputted from said differential detection diversity reception circuit and also said reliability information/differentially decoded result outputted from said least-squares combining diversity reception circuit based on a dimension of coincident symbol numbers.

4. A diversity receiver as claimed in claim 2 wherein:

said differential detection diversity reception circuit produces an error signal in combination with said soft decision data/hard decision data;

said least-squares combining diversity reception circuit outputs an error signal in combination with said reliability information/differentially decoded result; and while receiving said error signal outputted from said differential detection diversity reception circuit and said error signal outputted from said least-squares combining diversity reception circuit, said selection control circuit produces said selection control signal used to select one of said soft decision data/hard decision data outputted from said differential detection diversity reception circuit and said reliability information/differentially decoded result outputted from said least-squares combining diversity reception circuit based upon such a fact as to whether or not a square mean value of said error signal outputted from said differential detection diversity reception circuit is larger than a square mean value of said error signal outputted from said least-squares combining diversity reception circuit.

5. A diversity receiver as claimed in claim 2 wherein:

upon receipt of said received signals of said plural branches, said selection control circuit produces a selection control signal used to select one of said soft decision data/hard decision data outputted from said differential detection diversity reception circuit and said reliability information/differentially decoded result outputted from said least-squares combining diversity reception circuit based upon a fading pitch detected from said received signals of said plural branches.

6. A diversity receiver as claimed in claim 2 wherein:

in response to said received signals of said plural branches, said selection control circuit produces said selection control signal used to select one of said soft decision data/hard decision data outputted from said differential detection diversity reception circuit and said reliability information/differentially decoded result outputted from said least-squares diversity reception circuit based upon a received signal power calculated from said received signals of said plural branches.

* * * * *